| United States Patent [19] | [11] Patent Number: 5,015,422 |
| Yato et al. | [45] Date of Patent: May 14, 1991 |

[54] UO$_2$ PELLET FABRICATION PROCESS

[75] Inventors: Tadao Yato, Mito; Takeshi Onoue, Katsuta; Hiroshi Tanaka, Omiya, all of Japan

[73] Assignee: Mitsubishi Kinzoku Kabushiki Kaisha, Tokyo, Japan

[21] Appl. No.: 296,808

[22] Filed: Jan. 13, 1989

[30] Foreign Application Priority Data

May 25, 1988 [JP] Japan ................................ 63-127935

[51] Int. Cl.$^5$ .............................................. G21C 21/00
[52] U.S. Cl. ..................................... 264/0.5; 252/636; 252/643; 423/260; 423/261; 423/15
[58] Field of Search .................... 423/260, 261, 15; 264/0.5; 252/643, 636

[56] References Cited

U.S. PATENT DOCUMENTS

| 3,726,650 | 4/1973 | Welty | 423/15 |
| 3,758,664 | 9/1973 | Gerrald | 423/15 |
| 4,401,628 | 8/1983 | Chiang et al. | 423/15 |
| 4,430,276 | 2/1984 | Radford et al. | 264/0.5 |
| 4,505,882 | 3/1985 | Hasegawa et al. | 423/261 |
| 4,963,294 | 10/1990 | Yato et al. | 252/636 |

FOREIGN PATENT DOCUMENTS 59-137320 8/1984 Japan.
63-45127 2/1988 Japan.

*Primary Examiner*—Brooks H. Hunt
*Assistant Examiner*—Ngoclan T. Mai
*Attorney, Agent, or Firm*—Oblon, Spivak, McClelland, Maier & Neustadt

[57] ABSTRACT

Making uranium dioxide pellets of controlled grain size by treating 50–500 g/l UO$_2$F$_2$ with NH$_3$ in a first and a second stages to form (NH$_4$)$_2$U$_2$O$_7$ precipitate, wherein the NH$_3$/U molar ratio is between 3–5 in the first stage and between 6–12 in the second stage. The precipitate is then formed into UO$_2$ pellets having grain size within the range from 10 to 100 μm.

6 Claims, No Drawings

$UO_2$ PELLET FABRICATION PROCESS

BACKGROUND OF THE INVENTION

The present invention relates to a $UO_2$ fabrication process on the basis of an ADU (ammonium diuranate) process, and more particularly, to an improvement in a method of controlling the grain size of $UO_2$ pellets made from $UO_2$ powder produced by the ADU method, by adjustment of the precipitation conditions in the ADU method.

RELATED ART

As is well known, the ADU method is widely utilized as a process for fabricating $UO_2$ powder from $UF_6$.

The ADU method is such that an aqueous solution of $UO_2F_2$ obtained by reaction of $UF_6$ gas with water is reacted with $NH_4OH$ produced by passing $NH_3$ through the solution to precipitate the ADU. The ADU is then filtered and dried and, thereafter, calcined and reduced to form $UO_2$ powder. The reaction by which the ADU is formed is represented by the following chemical equations:

  (1)

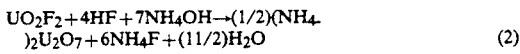  (2)

The $UF_6$ is first transformed to an aqueous solution of $UO_2F_2$ by the hydrolytic reaction represented by chemical equation (1). Then, since four moles of HF exists in the aqueous solution compared to one mole of uranium, a neutralizing reaction of HF takes place simultaneously in the second equation with the formation of ADU precipitate in the form of inactive particles of relatively large size. If the $UO_2$ powder obtained through the processes of calcination and reduction of the inactive ADU is employed as a raw material to form pellets, the grain size of the pellets is usually made to be approximately 10 $\mu$m.

In order to burn the $UO_2$ pellets in a nuclear reactor in a stable manner, it is desirable to decrease the fission-product gas (FP gas) release from the pellets as low as possible. It has been found that, if the grain size of the pellets is increased, the retention of the FP gas is enhanced. However, there is concern that excessively large grain in the pellets may result in a reduction of the mechanical strength thereof. Although an optimum grain size has not yet been determined, it is considered appropriate to aim for an upper limit of 100 $\mu$m.

In view of the above, the assignee of this invention has previously, in Japanese Patent Application No. 61-190079, proposed a process for fabricating $UO_2$ pellets having a large grain size.

The method disclosed in the above patent application is characterized in that $NH_3$ is reacted with a $UO_2F_2$ aqueous solution containing U but no HF, to form ADU, with the U concentration in the $UO_2F_2$ aqueous solution being within the range from 50 to 1000 g/l, and the rate at which the $NH_3$ is added to the $UO_2F_2$ aqueous solution being set to a value equal to or higher than two moles of $NH_3$/min for every one mole of U.

According to the above method, the lower the U concentration of the $UO_2F_2$ aqueous solution, and the higher the rate of adding the $NH_3$ to the $UO_2F_2$ aqueous solution, the smaller the size of the primary particles of ADU formed so that the particles are highly active when burned to form FP gas. As a result of this, the growth of the $UO_2$ grains of the $UO_2$ pellet obtained by way of $UO_2$ powder from ADU is accelerated so that the grain size becomes larger. This is done by appropriately setting the precipitating conditions within the aforesaid range making it possible to fabricate the $UO_2$ pellets with a grain size within the range from 10 to 100 $\mu$m.

In the above method, however, the rate of reaction between the U and the $NH_3$, and the $NH_3$/U molar ratio must be brought to a sufficiently high value, because of the necessity to maintain sufficient productivity as the ADU precipitates out. The reason for this is that, if the $NH_3$/U ratio is less than 6 (less than pH 10), all the U is not consumed in the reaction to form ADU precipitate so that some U remains in the waste liquid. The reason for the above is also that the low reaction rate results in a reduction in the productivity of ADU. Accordingly, by controlling the U concentration the size of the primary particles of the ADU can be adjusted. If $UO_2$ pellets are to be fabricated with a relatively small grain size near the low value of the range from 10 to 100 $\mu$m, the U concentration in the $UO_2F_2$ aqueous solution must be equal to or higher than 500 g/l. This inevitably raises the viscosity of the $UO_2F_2$ aqueous solution considerably, affecting the conditions of the precipitate, resulting in the disadvantage that the final $UO_2$ pellets becomes heterogeneous.

SUMMARY OF THE INVENTION

The invention has been done in order to solve the above-discussed problems related to optimum grain size, and it is the object of the invention to provide a $UO_2$ fabrication process which can control the grain size of $UO_2$ pellets to an optimal value within a range of from 10 to 100 $\mu$m, and which can fabricate pellets with homogeneous properties of any particle size.

DETAILED DESCRIPTION

A process for fabricating $UO_2$ pellets, according to the invention, will specifically be described below.

The process is characterized in that when ADU is precipitated, the U concentration in $UO_2F_2$ aqueous solution is brought to a value within the range from 50 to 500 g/l, that the reaction of the $UO_2F_2$ aqueous solution with $NH_3$ is divided into two stages, and that the $NH_3$/U molar ratio is set in the first step to a value within the range from 3 to 6, and in the second stage to a value within the range from 6 to 12.

According to the above-described process, the properties of the ADU formed are substantially determined by the precipitating reaction in the first stage. In this connection, if conditions are such that the $NH_3$/U molar ratio is equal to or less than 6, it is possible to form ADU as primary particles which are relatively large in size, even if the U concentration in the $UO_2F_2$ aqueous solution is equal to or less than 500 g/l. It is considered that the reason for this is that in the case where the $NH_3$/U molar ratio is equal to or less than 6, as the $NH_4F$ concentration increases on the basis of the reaction represented by the following chemical equation (3) in which the ADU is precipitated out of the $UO_2F_2$ aqueous solution, the $NH_4F$ causes a reaction to occur whereby the ADU is formed by way of ammonium uranyl fluoride (AUF), as represented by the equations (4) and (5):

$$UO_2F + 3NH_4OH \rightarrow (1/2)(NH_4)_2U_2O_7 + 2NH_4F + (3/2)H_2O \quad (3)$$

$$UO_2F_2 + 3NH_4F \rightarrow (NH_4)_3UO_2F_5 \quad (4)$$

$$(NH_4)_3UO_2F_5 + 3NH_4OH \rightarrow (1/2)(NH_4)_2U_2O_7 + 5NH_4F + (3/2)H_2O \quad (5)$$

Since the AUF is a crystalline material inert under normal conditions, the ADU formed by way of the AUF is also inert and has relatively large primary particles. The lower the $NH_3/U$ molar ratio set in the first stage reaction, the greater the tendency for the ADU to be formed by way of the AUF, so that ADU which is inert and has larger primary particles is obtained. It is not desirable for the $NH_3/U$ molar ratio to be lower than 3 in the first stage precipitating reaction, because this will lower the ratio at which the U is precipitated. On the other hand, if the $NH_3/U$ molar ratio is equal to or higher than 6, the conventional problems cannot be solved. In this connection, although the U remains in the aqueous solution even if the $NH_3/U$ molar ratio is within the range of from 3 to 6, it is possible to react the U sufficiently if the $NH_3/U$ molar ratio in the second stage reaction is brought to a value within the range of from 6 to 12. Further, if the $NH_3/U$ molar ratio is lower than 6 in the second stage reaction, the U is not sufficiently precipitated. On the other hand, there is no value in having a $NH_3/U$ molar ratio above 12, because this merely increases the amount of water used and an amount of waste liquid. Also in the case where the $NH_3/U$ molar ratio is brought to a value within the range from 6 to 12 in the second stage in order to precipitate the ADU sufficiently in the manner mentioned above, the properties of the resulting ADU are no different than those of the ADU formed in the standard method equation (2).

Thus, according to the process of this invention, it is possible to easily fabricate pellets with an optimal particle size within the range from 10 to 100 um and which are homogeneous in properties, without wasting the U even under for the condition where the U concentration in the $UO_2F_2$ aqueous solution is equal to or less than 500 g/l.

The advantages of the invention will next be expounded with reference to an embodiment.

The $UO_2F_2$ powder was dissolved in demineralized water to form an aqueous solution whose U concentration within the range from 40 to 600 g/l. The aqueous solution and $NH_3$ water were first fed continuously to a first-stage settling chamber, with a 2.5 to 6.5 $NH_3/U$ molar ratio, to carry out the first stage ADU precipitation. Subsequently, the ADU slurry formed in the first-stage settling chamber, and the aqueous $NH_3$ were fed continuously to a second stage settling chamber, and the $NH_3/U$ molar ratio brought to a value within the range from 5 to 15. The resulting second-stage ADU slurry was filtered and dried and, thereafter, calcined and reduced at 650° C. under a $H_2$ atmosphere, to transform the slurry into $UO_2$ powder. The $UO_2$ powder was compacted at a pressure of 5 t/cm², and then sintered for four hours at 1750° C. in an $H_2$ atmosphere, to form pellets.

The following table indicates the relationship between the pellet grain size and the ADU precipitating conditions at each of the first-stage and second-stage settling chambers.

TABLE

| U CONCENTRATION $UO_2F_2$ AQUEOUS SOLUTION (g/l) | FIRST STAGE $NH_3/U$ RATIO | SECOND STAGE $NH_3/U$ RATIO | PELLET GRAIN SIZE ($\mu$m) |
| --- | --- | --- | --- |
| 50 | 2.5 | 9.0 | 7 |
| 50 | 3.0 | 9.0 | 10 |
| 50 | 4.3 | 9.0 | 46 |
| 50 | 6.0 | 9.0 | 98 |
| 50 | 6.5 | 9.0 | 110 |
| 40 | 6.0 | 9.0 | 105 |
| 50 | 6.0 | 9.0 | 96 |
| 300 | 6.0 | 9.0 | 42 |
| 500 | 6.0 | 9.0 | 23 |
| 600 | 6.0 | 9.0 | 9 |
| 100 | 5.0 | 5.0 | 34 |
| 100 | 5.0 | 6.0 | 36 |
| 100 | 5.0 | 9.0 | 33 |
| 100 | 5.0 | 12.0 | 35 |
| 100 | 5.0 | 15.0 | 34 |

As will be clear from the above table, in case where the U concentration in the $UO_2F_2$ aqueous solution was 50 g/l, pellets having a grain size within the range from 10 to 100 $\mu$m were obtained when the $NH_3/U$ molar ratio in the first stage was within the range from 3 to 6. Further, if the $NH_3/U$ molar ratio in the first stage was brought to 6, pellets having a grain size within the range from 10 to 100 $\mu$m were obtained when the U concentration in the $UO_2F_2$ aqueous solution was within the range from 50 to 500 g/l. Moreover, if the U concentration was 100 g/l and the $NH_3/U$ molar ratio in the first stage was brought to 5, the grain size of the pellets remained practically unchanged, even if the $NH_3/U$ molar ratio in the second stage varied within the range from 5 to 15. If, however, the $NH_3/U$ molar ratio in the second stage was 5, the loss of the U was so great that approximately 20% of the U remained in the waste liquid. On the other hand, even if the $NH_3/U$ molar ratio in the second stage was 15, the U loss remained the same as for when the ratio ranged from 6 to 12, and a sufficiently high collecting ratio was obtained even if the $NH_3/U$ molar ratio in the second stage was within the range from 6 to 12.

As described above, according to the $UO_2$ pellet fabrication process of the invention, it is possible to easily fabricate pellets which have their optional grain size within the range from 10 to 100 $\mu$m and which are homogeneous in properties, without wasting the U even under conditions where the U concentration in the $UO_2F_2$ is equal to or less than 500 g/l. Thus, the amount of the pellets restrict the rate of release of fission product gas can be set to a desired value, making it possible to enhance the combustion stability of the pellets.

What is claimed is:

1. A process for fabricating $UO_2$ pellets of controlled grain size comprising:
   (i) treating an aqueous solution of 50 to 500 gl⁻¹ of $UO_2F_2$, containing no HF, with $NH_3$ at a molar ratio of $NH_3/U$ of from 3 to 5, to obtain a slurry of a precipitate of ADU $(NH_4)_2U_2O_7$ and an aqueous solution which also contains U;
   (ii) adding $NH_3$ to said solution to obtain an ADU $(NH_4)_2U_2O_7$ precipitate at a $NH_3/U$ molar ratio of from 6 to 12;
   (iii) filtering and drying said $(NH_4)_2U_2O_7$ precipitate;
   (iv) calcining and reducing said $(NH_4)_2U_2O_7$ under a hydrogen atmosphere forming $UO_2$ powder;
   (v) compacting said $UO_2$ powder; and (vi) sintering said compacted $UO_2$ powder in a $H_2$ atmosphere, forming pellets of $UO_2$ of a grain size of from 10 to 100 μm.

2. A process for fabricating $UO_2$ pellets according to claim 1 wherein $UO_2F_2$ powder is dissolved in demineralized water forming an aqueous solution which contains no HF.

3. A process for fabricating $UO_2$ pellets according to claim 1 wherein $NH_3$, water and an aqueous solution of $UO_2F_2$ are first fed continuously to a first-stage settling chamber, so that the $NH_3/UO_2F_2$ molar ratio is between 3 to 5, to carry out the first-stage ADU precipitation.

4. A process for fabricating $UO_2$ pellets according to claim 3 wherein ADU slurry is formed in the first-stage settling chamber, so that aqueous $NH_3$ is fed continuously to a second-stage settling chamber, and so that the $NH_3/UO_2F_2$ molar ratio becomes within a range of from 6 to 12.

5. A process for fabricating $UO_2$ pellets according to claim 4 wherein second-stage ADU slurry is filtered, dried, calcined and reduced under an $H_2$ atmosphere, transforming the slurry into $UO_2$ powder.

6. A process for fabricating $UO_2$ pellets according to claim 1 wherein $UO_2$ powder is compacted at a pressure of 5 t/cm$^2$, and then sintered for 4 hours at 1750° C. in an $H_2$ atmosphere, forming pellets.

* * * * *